United States Patent Office
3,129,900
Patented Apr. 21, 1964

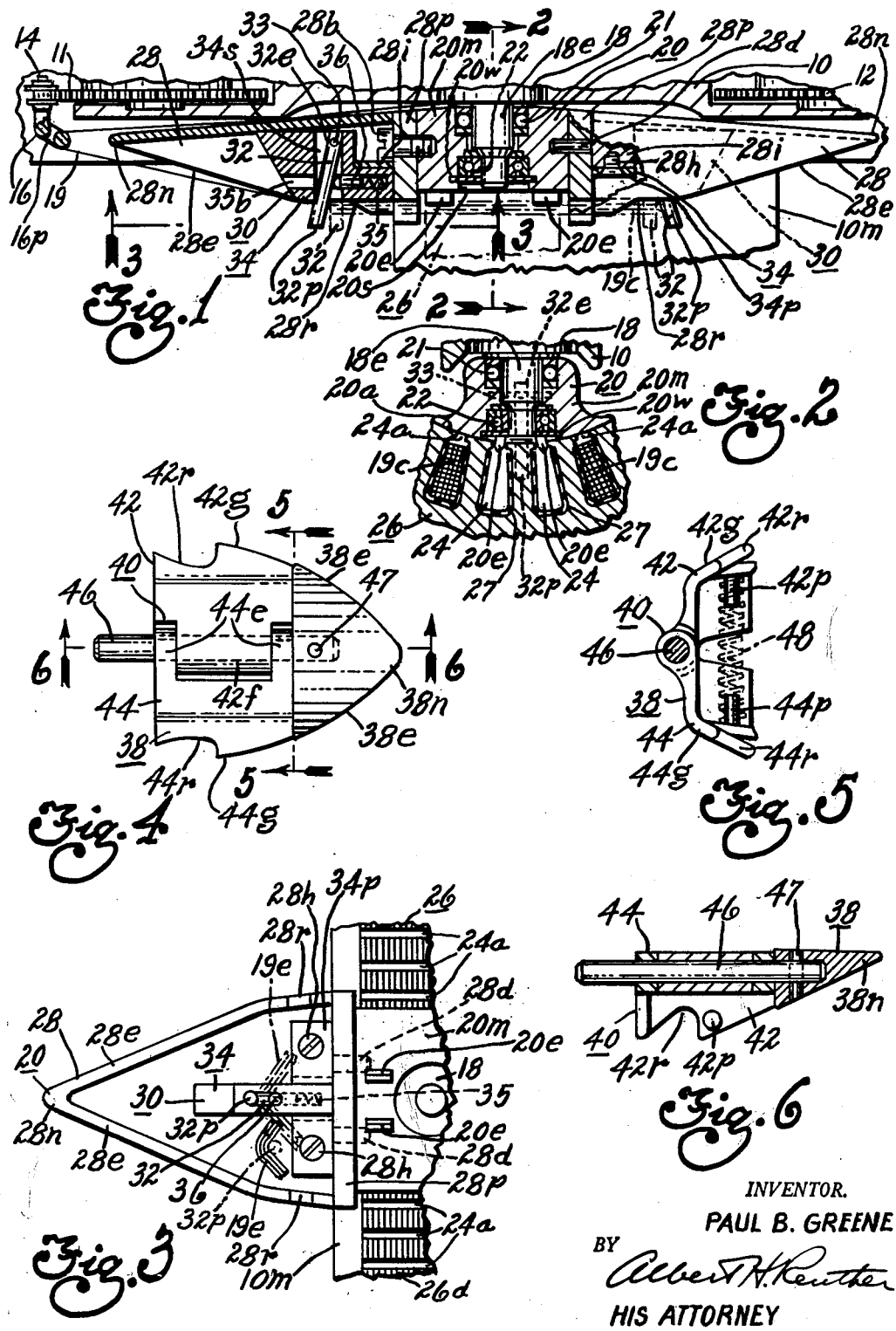

1

3,129,900
COIL FORMING MEANS FOR STATOR
WINDING MACHINE
Paul B. Greene, Miamisburg, Ohio, assignor to General
Motors Corporation, Detroit, Mich., a corporation of
Delaware
Filed Mar. 28, 1960, Ser. No. 18,125
3 Claims. (Cl. 242—1.1)

This invention relates to the manufacture of dynamoelectric machines or any other device having a slotted structure relative to which conducting material is fitted as coils formed and insulated relative thereto, and particularly, to a coil forming means for a stator winding machine adapted for winding coils in a pattern having overlapping adjacent coil sides and the like.

An object of this invention is to provide a wire guiding shoe or coil forming means for use on a stator winding machine means and having at least one pivotally supported portion thereon adapted to facilitate placement of coil wire relative to a slotted annular stator structure.

Another object of this invention is to provide a new and improved coil forming means adapted for use in guiding coil wire into slots of an annular structure located adjacent thereto and adapted to have at least one articulated member carried thereby for improvement in coil wire slot fill, in shaping of coil wire end turns, and the like.

Another object of this invention is to provide coil forming means adapted for use on a stator winding machine and having one pivotally mounted member located centrally thereon and biased normally longitudinally thereof so as to project initially beyond end turns of coil wire wound therearound into a substantially diamond-like, at least triangular shape as coil wire wound thereabout effects displacement of the pivotal member into a location substantially vertical like a post about which coil wire is forced to turn during winding thereof yet resiliently returned to a normally biased position upon removal of the member from a finished coil having a plurality of end turns adapted to be in overlapping relation to similarly formed end turns of a subsequently wound coil while the pivotal member can be used as a post for coil wire turning without interfering with any previously wound coil.

A further object of this invention is to provide coil forming means, shoe means and the like to aid in guiding wire wound as coils into slots of a dynamoelectric stator assembly and including a pivotal portion such as an outwardly biased post, a pair of articulated members urged into laterally spread apart relation as well as having a pocket portion, recess and the like provided by the coil forming means in a location immediately adjacent to termination of laterally as well as longitudinally extending guide sections thereof to lead wire into position for positive filling of slots.

Further objects and advantages of the present invention will be apparent from the following description, reference being had to the accompanying drawings wherein preferred embodiments of the present invention are clearly shown.

In the drawings:

FIGURE 1 is a fragmentary, partially-sectioned elevational view of coil forming means in accordance with the present invention.

FIGURE 2 is a fragmentary, partially-sectioned view taken along line 2—2 in FIGURE 1.

FIGURE 3 is a view taken along line 3—3 in FIGURE 1.

FIGURE 4 is a plan view of further coil forming means in accordance with the present invention.

2

FIGURE 5 is a view taken along line 5—5 in FIGURE 4.

FIGURE 6 is a view taken along line 6—6 in FIGURE 4.

FIGURE 1 illustrates coil forming means, wire guiding shoe means and the like installed relative to a stator winding machine means provided with a winding head portion 10 a fragment of which is shown in this view. The winding head portion 10 provides journalling support for a pair of sprockets 11 and 12 which are longitudinally separated from each other. A chain 14 traverses teeth of these sprockets 11 and 12 in a closed loop that also defines a path of movement for an eyelet 16 carried by the chain 14. A snorkel member 18 is journalled relative to the winding head portion 10 at a location inside and centrally as well as intermediate the loop path defined by chain 14 about the sprockets 11 and 12. Further details as to operation of the stator winding machine means including these winding head components can be obtained by reference to co-pending application, S.N. 692,847, Greene et al., filed October 28, 1957, now Patent 2,988,291, issued June 13, 1961, and an application S.N. 11,654, Greene, filed February 29, 1960, both belonging to the assignee of the present invention.

A wire 19 is fed from the snorkel member 18 to eyelet 16 having a passage 16p as set forth in further detail in the copending application. The wire 19 passes from the eyelet 16 to a coil forming means, wire guiding shoe means and the like identified generally by numeral 20. A central member, body portion or intermediate mounting means 20m of this coil forming means 20 is journalled by bearing means 21 and 22 relative to an extension 18e integral with the snorkel member 18. The central body portion or intermediate mounting means 20m also includes pairs of integral extensions 20e visible in views of FIGURES 1, 2 and 3 and adapted to fit longitudinally as keys or guides relative to openings or apertures 24a of slots 24 extending radially in an annular stator assembly 26. This stator assembly can include a plurality of slotted discs or laminations 26d having slots 24 therein in longitudinally aligned relation to each other. Each of the slots 24 is fitted with a U-shaped channel or slot liner 27 of suitable insulating material as shown in FIGURE 2. The wire 19 is fitted inside these slot liners 27 as coils 19c outlined in FIGURE 1 and shown in a cross-sectional view in FIGURE 2. The coils 19c fit into predetermined pairs of slots 24 and have end turns 19e thereof located on opposite sides of the stator assembly 26. The central body portion or intermediate mounting means 20m includes an arcuate portion 20a adapted to fit complementary to an inner curved stator assembly surface formed intermediate the slot openings or apertures 24a relative to which wire 19 is fitted. The coils 19c can be fitted into the slots 24 in multiple layers such that a plurality of stator coils are wound to have more than one end turn 19e a fragment of which is shown and further outlined in the plan view of FIGURE 3. The coils 19c of wire 19 and end turns 19e are formed further in accordance with the present invention due to operation of mechanism set forth in further detail below.

As shown in FIGURES 1 and 3, end members or shoe-like wire guide portions 28 are carried by the central body portion or intermediate mounting means 20m on opposite sides thereof. These shoe-like wire guide portions are longitudinally away from each other within the closed looped path of chain 14 that carries the eyelet 16. These end members 28 include an integral plate portion 28p adapted to fit complementary opposite sides of the intermediate mounting means 20m. At least one bolt 28b is provided to hold plate portion 28p to the intermediate mounting means 20m on each side. A peened over or swaged portion 20s of the intermediate mounting member holds a washer or disc 20w against one of the bearing means 22 so as to secure the central body portion or intermediate mounting means directly to the integral extension 18e of the snorkel member 18. Each end portion or shoe-like wire guide portion 28 has a nose-like end 28n around which coil wire 19 is moved due to movement of the eyelet 16 about a closed loop as defined by the chain 14 relative to the sprockets 11 and 12. Each end portion or shoe-like wire guide portion 28 has a pair of diverging wire guide edges 28e that extend laterally outwardly as well as longitudinally from each nose portion 28n to a location longitudinally and laterally in alignment with a pair of predetermined slots into which coil wire 19 of the stator assembly is to be fitted. The stator assembly 26 is supported in a predetermined location on a base or mounting portion 10m of stator winding machine means having the winding head portion 10 as disclosed in copending applications mentioned earlier. Each of the end portions or shoe-like wire guide portions can have a pair of pins or dowels 28d press fitted at one end thereof or otherwise secured to verticle plate portions 28p and projecting into suitable bores in spaced relationship to each other on opposite sides of the central body portion or intermediate mounting means 20m. The sectioning of FIGURE 1 in the left hand portion of the view is taken centrally so as to illustrate the bolt 28b that is located intermediate these dowels 28d and the sectioning is modified in a remaining portion of the view to indicate the dowel 28d to one side thereof. One or more dowels 28d can be provided and in conjunction with the bolt 28b, these dowels serve to maintain proper alignment of opposite end portions 28 relative to the central body portion or intermediate mounting means 20m.

Each of the wire guiding edges 28e extends laterally and longitudinally as well as downwardly to a cutout or recess portion 28r wherein wire 19 is grouped as part of end turns 19e of the coils 19c.

Further in accordance with the present invention, each of the end portions or shoe-like wire guide portions 28 is provided with articulated means generally indicated by numeral 30. In the embodiment of FIGURES 1, 2 and 3 this articulated means 30 includes a single post-like member or rod 32 having a downwardly projecting portion or end 32p and an opposite end 32e hinged, journalled or pivotally mounted relative to a cross member or pin 33 as indicated in FIGURES 1 and 2. The post-like member 32 is adapted to swing longitudinally to and fro in a space 34s provided in a housing or body 34 secured by plate-like portions 34p therewith relative to a pair of opposite integral extensions 28i of the plate portion 28p of each end portion or shoe-like wire guide portion 28. Head screws 28h are provided as fastening means for holding the plate portions 34p of housing 34 in a location adjacent to an underside of each end portion or shoe-like wire guide portion 28. It is apparent in the views of FIGURES 1 and 3 that each of the end portions is located on opposite sides of the stator assembly 26. Slots 24a in the stator assembly 26 extend substantially parallel to each other and longitudinally relative to the coil wire fitted therein while end turns 19e as guided by the edges or segments or sectors 28e are formed to have a diamond-like or triangular shape extending laterally between a pair of predetermined slots.

The post-like member 32 hinged by the pin 33 relative to housing 34 is normally biased in a direction away from the central body portion or intermediate mounting means 20m by force from spring means 35 fitted into a cavity of the housing 34 and urging a plug means 36 against an intermediate portion of the post-like member 32. The end of the plug means 36 remote from the spring means 35 can have a bullet-like shape so as to assure minimum friction in engagement thereof relative to the post-like member 32. The cavity in which spring means 35 is located is at a terminal end of a bore 35b in the housing 34.

It is apparent in the view of FIGURE 1 that the projecting end 32p of the hinged or post-like member 32 can be shifted in position. Normal biasing of a pair of spring means 35 on opposite sides of the intermediate mounting means 20m is such that these projecting ends 32p are normally biased away from each other. This normal biased position is indicated by full lines in views of both FIGURES 1 and 3. Phantom lines in FIGURES 1 and 3 represent shifting of the articulated member 32 into a substantially vertical position due to winding of wire 19 therearound as the eyelet 16 traverses a closed-loop path defined by the movement of chain 14 around the sprockets 11 and 12. To facilitate functioning of the hinged member 32 in the embodiment of FIGURES 1, 2 and 3, there is a phantom showing of a coil 19c in FIGURE 1 as well as both a phantom showing of end turns 19e and a solid showing of end turns 19e in FIGURE 3. The end turns 19e shown by solid lines in FIGURE 3 are substantially triangular or diamond-like in shape due to wrapping of coil wire 19 around the end projection 32p shown in phantom during a previous positioning of the end portion 28. Winding of coil wire 19 around the projecting end 32p of the hinged member 32 effects displacement of the member into a substantially verticle position against the bias of the plug means 36 resiliently backed by the spring means 35. The winding head portion together with the coil forming means can be retracted from engagement with the stator assembly 26 and the latter is indexed in an arcuate direction as set forth in further detail in the co-pending applications mentioned earlier. Upon retraction of the coil forming means from engagement with the stator assembly, the projecting end 32p of the hinged member is removed from engagement with the end turns 19e shown by solid lines in FIGURE 3 and the plug means 36 transmits force of the spring 35 to return the projecting end 32p to a position biased normally away from the intermediate mounting means 20m. Without this biasing of the projecting end 32p away from the intermediate mounting means 20m there would be a gouging as well as an undesirable engagement and displacement of lateral portions of the end turns 19e if the projecting ends 32p were to remain in a substantially vertical position and then were lowered directly on to a previously wound number of coil end turns 19e indicated by solid lines in FIGURE 3. In accordance with the present invention, the projecting end 32p is biased longitudinally and axially away from the previously wound end turns 19e indicated by solid lines in FIGURE 3 and only during actual winding of wire 19 into a subsequent coil is the projecting end 32p again deflected into a substantially vertical position. As the projecting end 32p is biased into a normally outwardly extending position, there is no danger of gouging or damaging of any previously wound end turns. Deflecting of the projecting end 32p during winding of a subsequent coil is such that at most the projecting end 32p comes only tangentially into contact with previously wound end turns. As a result, a progressive number of diamond-shaped or triangular end turns 19e shown further by phantom lines in the view of FIGURE 3 can be effectively and efficiently formed in accordance with the present invention. The post-like member 32 is thus a hinged structure that can swing down to be used during formation of a subsequent coil without gouging of a previously wound coil. It is to be understood that in place of biasing by spring means 35, it would also be possible to have the post-like member 32 pivoted about a pin such as 33 by a counter-weight remote from the projecting end 32p at a location similar to that of end 32p relative to the pivot pin 33. It is to be understood that the coils 19c formed in accordance with the present invention using the hinged structure or articulated members 32 have opposite sides of the coils in the slots in overlapping relation to previously wound coil sides also in the slots. Use of the coil forming means in accordance with the present invention permits machine winding of coil wire into main and phase lap windings rather than use of manually fitted concentric windings of either main, phase or both main and phase windings on a dynamoelectric machine. It is also to be understood that deep and shallow slots can be used in either round or substantially square lamination assemblies relative to which coil wire is fitted by machine winding in accordance with the present invention. Coil separators of insulating material as well as slot closing means of insulating material can be fitted by machine operation into predetermined positions relative to wire filled slots in accordance with a disclosure of co-pending application, S.N. 11,654, Greene, filed February 29, 1960. The coil forming means in accordance with the present invention can be provided on a stator winding machine means equipped in accordance with this co-pending application.

It is noted that the views of FIGURES 4, 5 and 6 show further end portions 38 that can also be fitted on opposite sides of the intermediate mounting means 20m noted earlier. In the views of FIGURES 4, 5 and 6, these end portions 38 include a contoured nose portion 38n as well as a pair of articulated members or hinge structures generally indicated by numeral 40. The hinge structure 40 includes a pair of articulated portions or lateral members 42 and 44 which are pivotally mounted relative to a longitudinally extending pin or shaft 46 press fitted into tight engagement adjacent to the nose portion 38n of each shoe-like means or end portion 38. It is to be understood that the one end of the shaft 46 can also be held to the end portion 38 by means of a transverse dowel 47 visible in FIGURES 4 and 6. The portion or articulated member 44 has a pair of extensions 44e which establish the articulated and pivotal connection relative to the shaft 46. The member 42 has a central flange 42f which dovetails between the extensions 44e and also establishes the pivotal connection relative to the shaft 46. A spring means outlined in FIGURE 5 and identified by numeral 48 can be added for biasing the articulated members 42 and 44 laterally apart into a spread relationship. Provision of such a resilient means as the spring 48 coiled over projections 42p and 44p relative to opposite ends thereof engaged by the spring relative to the members 42 and 44 respectively assures sufficient width for the guiding of coil wires such as 19 around longitudinally and laterally extending edges 38e diverging from the nose portion 38n. These edges 38e are similar to the edges or guide sectors 28e shown in views of FIGURES 1 and 3. However, additional or supplemental curved edge-like guide sections 42g and 44g of the members 42 and 44 respectively also extend longitudinally and laterally beyond edges 38e. Each of the members 42 and 44 has a pocket or recess indicated by numerals 42r and 44r respectively. The pockets or recesses 42r and 44r assure even slot filling with substantially uniform distribution of coil wire such as 19 relative to the slots and not just the winding of this coil wire along only an inner or laterally adjacent pair of portions inside a pair of slots. Hinge action provided by journalling of the members 42 and 44 relative to the shaft or pin 46 assures greater flexibility and tends to provide increased efficiency in placement of the coil wire relative to the slots. It is to be noted that the end of the shaft 46 remote from the nose portion 38n can be press fitted or otherwise secured or threaded relative to an intermediate mounting means or central body portion such as 20m in place of the bolt 28b used to hold the end portions or members 28 on opposite sides of the central body portion.

It is noted that movement of the members 42 and 44 is substantially transverse to a longitudinal axis or plane through the shaft 46 while movement of the hinge structure or post-like member 32 is arcuately in a plane coincident longitudinally with the direction of spacing of the end portions 28 away from each other on opposite sides of the intermediate mounting means or central body portion. The pockets, recesses and the like such as 28r, 42r, and 44r assure retention of grouped end turns of coil wire at a location immediately adjacent and in between the stator structure and guide sections.

While the embodiments of the present invention constitute preferred forms, it is to be understood that other forms might be adopted.

What is claimed is as follows:

1. A coil forming device for use in combination with a wire feeding means to wind coils on a slotted member of a dynamoelectric machine, said coil forming device comprising a central body portion adapted to be journalled to said wire feeding means and having extensions formed thereon and receivable in slots of said slotted member, and wire guide means comprising a pair of tapered end portions secured to opposite ends of said body portion, said wire guide means including elongated wire engaging means pivotally mounted thereon and pivotally movable upon engagement by wire from a first position wherein the free ends of said elongated means extend in a generally outwardly direction toward the ends of said tapered portions to a second position wherein said elongated means are substantially parallel so that the distance between said free ends is decreased, and means for returning said elongated means from said second position to said first position.

2. A coil forming device as defined by claim 1 wherein said last means includes a spring resiliently biasing said elongated means to said first position.

3. A coil forming device for use in combination with a wire feeding means to wind coils on a slotted member of a dynamoelectric machine, said coil forming device comprising a central body portion adapted to be journalled to said wire feeding means and having extensions formed thereon and receivable in slots of said slotted member, and wire guide means comprising a pair of tapered end portions secured to opposite ends of said body portion, and said wire guide means including a housing secured thereto, a first slot in said housing extending in a direction substantially perpendicular to the plane of said guide means, a post like member pivotally mounted within said slot and having a free end extending outside of said housing into the path of wire from said wire feeding means, a second slot in said housing normal to said first slot and a spring bias plunger in said second slot and interposed between one wall of said housing and said post like member to resiliently bias said post like member in a direction outwardly and toward the ends of said wire guide means.

References Cited in the file of this patent

UNITED STATES PATENTS

| 2,578,495 | Wirth | Dec. 11, 1951 |
| 2,738,136 | Bugg | Mar. 13, 1956 |

FOREIGN PATENTS

| 718,295 | Germany | Mar. 9, 1942 |